US012017800B2

(12) United States Patent
Yuhara

(10) Patent No.: US 12,017,800 B2
(45) Date of Patent: Jun. 25, 2024

(54) METHOD OF DESIGNING A SHAPE OF AN AIRFRAME OF A SUPERSONIC AIRCRAFT, PRODUCTION METHOD OF A SUPERSONIC AIRCRAFT, AND SUPERSONIC AIRCRAFT

(71) Applicant: JAPAN AEROSPACE EXPLORATION AGENCY, Tokyo (JP)

(72) Inventor: Tatsunori Yuhara, Tokyo (JP)

(73) Assignee: Japan Aerospace Exploration Agency, Tokyo (JP)

( * ) Notice: Subject to any disclaimer, the term of this patent is extended or adjusted under 35 U.S.C. 154(b) by 932 days.

(21) Appl. No.: 17/042,720

(22) PCT Filed: Feb. 21, 2019

(86) PCT No.: PCT/JP2019/006509
§ 371 (c)(1),
(2) Date: Sep. 28, 2020

(87) PCT Pub. No.: WO2019/187828
PCT Pub. Date: Oct. 3, 2019

(65) Prior Publication Data
US 2021/0016900 A1    Jan. 21, 2021

(30) Foreign Application Priority Data

Mar. 29, 2018   (JP) ................. 2018-064900

(51) Int. Cl.
*B64F 5/10*      (2017.01)
*B64C 23/04*    (2006.01)
(Continued)

(52) U.S. Cl.
CPC ............... *B64F 5/10* (2017.01); *B64C 30/00* (2013.01); *G06F 30/15* (2020.01); *B64C 23/04* (2013.01);
(Continued)

(58) Field of Classification Search
CPC ........ B64F 5/10; G06F 30/15; G06F 2113/28; G06F 2111/10; B64C 30/00
(Continued)

(56) References Cited

U.S. PATENT DOCUMENTS 6,942,178 B2 *   9/2005  Morgenstern ............. B64F 5/00
                                                     244/119
7,252,263 B1 *   8/2007  Hagemeister ........... B64C 30/00
                                                     244/119
(Continued)

FOREIGN PATENT DOCUMENTS

JP        2009-012686 A      1/2009
JP        5057374 B2         10/2012
(Continued)

OTHER PUBLICATIONS

Office Action dated Feb. 14, 2022 in Japanese Application No. 2020-510433.
(Continued)

*Primary Examiner* — Iftekhar A Khan
(74) *Attorney, Agent, or Firm* — Saliwanchik, Lloyd & Eisenschenk

(57) ABSTRACT

[Object] To realize an improvement in design accuracy and a reduction in design time in a process of matching an equivalent cross-sectional area of a design shape of a supersonic aircraft to a target equivalent cross-sectional area in a sonic boom reduction method based on an equivalent cross-sectional area.
[Solving Means] The technique includes: setting an initial shape of the airframe and a target equivalent cross-sectional area of the airframe; estimating a near field pressure waveform for the initial shape of the airframe assuming that the supersonic aircraft flies at a cruising speed; evaluating an equivalent cross-sectional area from the estimated near field pressure waveform for the initial shape of the airframe; and
(Continued)

setting a Mach plane corresponding to the cruising speed, and setting a design curve on the Mach plane, the design curve corresponding to an initial curve at which the initial shape of the airframe and the Mach plane intersect so that the equivalent cross-sectional area approaches the target equivalent cross-sectional area. Then, the shape of the airframe is designed based on the design curve.

9 Claims, 15 Drawing Sheets

(51) Int. Cl.
*B64C 30/00* (2006.01)
*G06F 30/15* (2020.01)
*G06F 111/10* (2020.01)
*G06F 113/28* (2020.01)

(52) U.S. Cl.
CPC ....... *G06F 2111/10* (2020.01); *G06F 2113/28* (2020.01)

(58) Field of Classification Search
USPC .............................................................. 703/1
See application file for complete search history.

(56) References Cited

U.S. PATENT DOCUMENTS

| | | | | |
|---|---|---|---|---|
| 8,403,256 | B1* | 3/2013 | Gregg, III | B64C 9/38 244/119 |
| 2005/0108269 | A1 | 5/2005 | Szajdecki | G06F 3/0626 707/999.102 |
| 2005/0116107 | A1* | 6/2005 | Morgenstern | B63B 39/06 244/130 |
| 2005/0116108 | A1* | 6/2005 | Morgenstern | B64C 30/00 244/130 |
| 2005/0121555 | A1* | 6/2005 | Morgenstern | B64C 30/00 244/130 |
| 2005/0218267 | A1* | 10/2005 | Makino | B64C 30/00 244/130 |
| 2005/0230531 | A1* | 10/2005 | Horinouchi | B64C 3/10 244/47 |
| 2006/0038063 | A1* | 2/2006 | Graham | B64C 30/00 244/35 A |
| 2007/0252028 | A1* | 11/2007 | Morgenstern | B64C 30/00 244/1 N |
| 2008/0105783 | A1* | 5/2008 | Laflin | B64U 20/70 244/119 |
| 2012/0166148 | A1* | 6/2012 | Yoshida | G06F 30/15 703/1 |
| 2014/0145027 | A1* | 5/2014 | Pogosyan | B64C 3/10 244/55 |
| 2015/0108269 | A1 | 4/2015 | Lugg | |
| 2019/0112032 | A1* | 4/2019 | Maxwell | B64C 30/00 |

FOREIGN PATENT DOCUMENTS

| | | | |
|---|---|---|---|
| WO | WO-2005/047102 A2 | 5/2005 | |
| WO | WO-2019187828 A1 * | 10/2019 | ............ B64C 30/00 |

OTHER PUBLICATIONS

International Search Report in International Application No. PCT/JP2019/006509, filed Feb. 21, 2019.
Li, W. et al., "Inverse Design of Low-Boom Supersonic Concepts Using Reversed Equivalent-Area Targets," *Journal of Aircraft*, Jan.-Feb. 2014, 51(1):29-36, American Institute of Aeronautics and Astronautics.
Seebass, R. et al., "Sonic-Boom Minimization," The Journal of the Acoustical Society of America, 1972, 51(2):686-694, Acoustical Society of America.
Darden, C. M., "Sonic-Boom Minimization With Nose-Bluntness Relaxation," *NASA Technical Paper 1348*, Jan. 1979, National Aeronautics and Space Administration.
Yuhara, T. et al., "Curvature Distribution of Equivalent Area for Lowered Aft-Boom," *The Japan Society for Aeronautical and Space Sciences*, 2017, pp. 1-4, with English abstract.
Barger, R. L. et al., "Fuselage Design for a Specified Mach-Sliced Area Distribution," *NASA Technical Paper* 2975, 1990, pp. 1-16, National Aeronautics and Space Administration.
Wintzer, M. et al., "Under-Track CFD-Based Shape Optimization for a Low-Boom Demonstrator Concept," *AIAA Aviation*, Jun. 22-26, 2015, American Institute of Aeronautics and Astronautics.
Supplementary European Search Report dated Apr. 16, 2021 in European Application No. 19775252.0.
Office Action dated Sep. 21, 2021 in Japanese Application No. 2020-510433.
Office Action dated Oct. 23, 2023 in European Application No. 19 775 252.0.

* cited by examiner

METHOD OF DESIGNING A SHAPE OF AN AIRFRAME OF A SUPERSONIC AIRCRAFT, PRODUCTION METHOD OF A SUPERSONIC AIRCRAFT, AND SUPERSONIC AIRCRAFT

CROSS-REFERENCE TO RELATED APPLICATIONS

This application is the U.S. national stage application of International Patent Application No. PCT/JP2019/006509, filed Feb. 21, 2019, which claims the benefit under 35 U.S.C. § 119 of Japanese Application No. 2018-064900, filed Mar. 29, 2018, the disclosures of each of which are incorporated herein by reference in their entirety.

TECHNICAL FIELD

The present invention relates to a method of designing an airframe shape of a supersonic aircraft that reduces a sonic boom, a production method of a supersonic aircraft, and a supersonic aircraft.

BACKGROUND ART

Generally, supersonic aircraft are required to suppress sonic booms, which are acoustic phenomena on people, animals, or structures such as buildings on the ground, during supersonic flight in order to satisfy the requirement of environmental compatibility. The reduction method of the sonic boom has been studied for a long time, and the most effective method is to change the generation pattern of the shock wave by devising the airframe shape, and to reduce the sonic boom intensity on the ground. The shock waves usually generated from the various parts of the supersonic aircraft are integrated into two strong shock waves at the bow and the tail, accompanied by the phenomenon that the large wave of pressure fluctuation propagates faster through the atmosphere in the process of propagating through the atmosphere, and are observed as N-type pressure waves with two large pressure rises above the ground. The shock wave propagated by the supersonic aircraft propagates in a conical form and reaches the ground.

Since supersonic flight over land is restricted by noise problems caused by sonic booms, it becomes a problem of practical application of a supersonic passenger aircraft. Conventional sonic boom reduction method forms low sonic boom pressure waveform which is not the usual N type by designing the airframe shape and suppressing integration of shock waves. George and Seebass, and Darden proposed boom minimization including a rear end wave based on the near field theory, and presented the theory noticing the sum of lift equivalent cross-sectional area obtained from the volume equivalent cross-sectional area and lift distribution of the aircraft forming the low sonic boom pressure waveform (Non-Patent Literatures 1 and 2).

Since then, when simply referred to as "equivalent cross-sectional area", it refers to the sum of volume equivalent cross-sectional area and lift equivalent cross-section. Here, the equivalent cross-sectional area of the aircraft is the distribution of the projected area in the axial direction of the aircraft of the cross-sectional area cut along the Mach plane determined by the cruise Mach number of the aircraft. Incidentally, according to the geometric relationship, the cross-sectional area coincides with the value obtained by multiplying the cruise Mach number by the projected area.

In general, the volume equivalent cross-sectional area and the lift equivalent cross-sectional area are calculated from the shape of the aircraft and the lift distribution, but Li et al. devised a technique to calculate the equivalent cross-sectional area from the near field waveform, facilitating the application of the conventional sonic boom reduction method (Non-Patent Literature 3).

George and Seebass, and Darden proposed an equivalent cross-sectional area to form a low sonic boom pressure waveform and a supersonic aircraft to realize it, but there was a problem in flight stability. Therefore, Makino proposed an equivalent cross-sectional area and a supersonic aircraft that achieve both flight stability and low sonic boom (Patent Literature 1).

CITATION LIST

Patent Literature

Patent Literature 1: Japanese Patent No. 5057374

Non-Patent Literature

Non-Patent Literature 1: Seebass, R., and George, A., "Sonic-Boom Minimization," Journal of the Acoustical Society of America, Vol. 51, No. 2, 1972, pp. 686-694.

Non-Patent Literature 2: Darden, C., "Sonic Boom Minimization With Nose-Bluntness Relaxation," NASA TP-1348, 1979.

Non-Patent Literature 3: Li, W., and Rallabhandi, S., "Inverse Design of Low-Boom Supersonic Concepts Using Reversed Equivalent-Area Targets," Journal of Aircraft, Vol. 51, No. 1, 2014, pp. 29-36.

Non-Patent Literature 4: Tatsunori Yuhara, Atshushi Ueno, Yoshikazu Makino, Curvature distribution of equivalent cross-sectional area for purpose of reducing rear end boom, The Japan Society for Aeronautical and Space Sciences, 55th Aircraft Symposium, 3A09, Shimane Civic Center, 2017.

Non-Patent Literature 5: Barger, R. L., Fuselage Design for a Specified Mach-Sliced Area Distribution, NASA-TP-2975, 1990

Non-Patent Literature 6: Wintzer, M. et al., Under-Track CFD-Based Shape Optimization for a Low-Boom Demonstrator Concept, AIAA 2015-2260, 2015.

DISCLOSURE OF INVENTION

Technical Problem

As mentioned above, in order to realize an equivalent cross-sectional area forming a low sonic boom pressure waveform, the airframe shape is designed and the process of matching the equivalent cross-sectional area of the design shape to the target equivalent cross-sectional area is performed. This process is formulated as the following optimization problem (1).

$$\text{minimize} \sum_{i=1}^{n} [Ae(i) - Ae^{Target}(i)]^2$$

Where
i denotes a discrete point in the aircraft axial direction,
Ae(i) denotes the equivalent cross-sectional area at the position i in the aircraft axial direction, and
$Ae^{Target}$(i) denotes the target equivalent cross-sectional area at the position i in the aircraft axial direction.

In the process, design time and design accuracy become problems. Regarding design time, it is an object to reduce the number of repetitions of the process that makes the equivalent cross-sectional area of the design shape coincide with the target equivalent cross-sectional area. Regarding design accuracy, in addition to matching of the equivalent cross-sectional area of the design shape and the target equivalent cross-sectional area, matching or coinciding of the first-order derivative is an object, which is suggested by the present inventors (Non-Patent Literature 4).

Barger proposed a fuselage design technique for supersonic aircraft to realize an equivalent cross-sectional area forming a low sonic boom pressure waveform (Non-Patent Literature 5). In the fuselage design technique, the three-dimensional shape is formed by connecting each two-dimensional cross section defined on the plane perpendicular to the aircraft axis, and the design of each two-dimensional cross section is repeated until the equivalent cross-sectional area of the design shape is matched to the target equivalent cross-sectional area. However, as described above, design time and design accuracy have been a problem.

Wintzer et al. defined not only the fuselage but also the main wings, tail, and nacelles in each two-dimensional cross section in the same manner as Barger, applied the sonic boom reduction method, and showed the result which suggested the problem of design time and design accuracy (Non-Patent Literature 6).

In view of the above circumstances, it is an object of the present invention to provide a method of designing an airframe shape of a supersonic aircraft, a production method of a supersonic aircraft, and a supersonic aircraft, that may realize an improvement in design accuracy and a reduction in design time in a process of matching an equivalent cross-sectional area of a design shape of a supersonic aircraft to a target equivalent cross-sectional area of a sonic boom reduction method based on an equivalent cross-sectional area.

Solution to Problem

The present inventors have obtained a knowledge that, in the background of the problems of the technique shown by Barger or Wintzer, each two-dimensional cross-section (design curve) constituting the three-dimensional shape is defined on a "plane that is not parallel to the Mach plane". That is, when changing the cross-sectional area of the two-dimensional cross-sectional area defined on a plane perpendicular to the aircraft axis at a predetermined position of the aircraft axis, the volume equivalent cross-sectional area is changed in a certain section before and after a predetermined position of the aircraft axis. For example, when the design curve at the position i point in the aircraft axial direction is changed, the equivalent cross-sectional area that changes correspondingly affects not only Ae(i), but also the wide range including . . . Ae(i−2), Ae(i−1), Ae(i), Ae(i+1), and Ae(i+2) . . . .

In view of such circumstances, the present inventors have led to create the present invention.

A method of designing a shape of an airframe of a supersonic aircraft according to an embodiment of the present invention includes: setting an initial shape of the airframe and a target equivalent cross-sectional area of the airframe; estimating a near field pressure waveform for the initial shape of the airframe assuming that the supersonic aircraft flies at a cruising speed; evaluating an equivalent cross-sectional area from the estimated near field pressure waveform for the initial shape of the airframe; and setting a Mach plane corresponding to the cruising speed, and setting a design curve on the Mach plane, the design curve corresponding to an initial curve at which the initial shape of the airframe and the Mach plane intersect so that the equivalent cross-sectional area approaches the target equivalent cross-sectional area. Then, the shape of the airframe is designed based on the design curve.

In the present invention, in order to set the design curve on the Mach plane on which equivalent cross-sectional area is defined, the change in the equivalent cross-sectional area with respect to the design curve is one-to-one. For example, when the design curve at the position i point in the aircraft axial direction is changed, the equivalent cross-sectional area that changes correspondingly is only Ae(i). Therefore, the process of matching the equivalent cross-sectional area of the design shape of the supersonic aircraft to the target equivalent cross-sectional area of the sonic boom reduction method based on the equivalent cross-sectional area is formulated as the following optimization problem (2).

$$\text{minimize}(i): [Ae(i)-Ae^{Target}(i)]^2$$

where i=1, 2 . . . n

That is, the optimization problem (1) is divided into a plurality of small optimization problems. As a result, each optimization problem becomes simple, and improvement of design accuracy and shortening of design time may be realized.

In the step of setting the design curve on the Mach plane, the area of a region surrounded by the initial curve and the design curve on the Mach plane may be matched to a value obtained by multiplying a difference between the target equivalent cross-sectional area and the equivalent cross-sectional area at a position corresponding to the region by a cruise Mach number corresponding to the cruising speed to thereby set the design curve on the Mach plane. In the step of setting the design curve on the Mach plane, a midpoint of the design curve of the Mach plane is set as as a control point, a position of the control point is set as a design variable, and the control point may be optimized such that the area is matched to the value obtained by multiplying.

In the step of setting the initial shape of the airframe and the target equivalent cross-sectional area of the airframe, the target equivalent cross-sectional area may be set based on the equivalent cross-sectional area of the initial shape.

The method may further include: after the step of setting the design curve on the Mach plane, estimating a near field pressure waveform for a shape corresponding to the design curve of the airframe assuming that the supersonic aircraft flies at a cruising speed; evaluating an equivalent cross-sectional area from the estimated near field pressure waveform for the shape corresponding to the design curve of the airframe; and setting a Mach plane corresponding to the cruising speed, and resetting a design curve on the Mach plane, the design curve corresponding to a curve at which the shape corresponding to the design curve of the airframe and the Mach plane intersect so that the equivalent cross-sectional area approaches the target equivalent cross-sectional area.

Thus, the sonic boom may be reduced even in the case of the region where the change of the lift equivalent cross-sectional area may not be ignored.

In the step of estimating the near field pressure waveform, the near field pressure waveform may be estimated by wind tunnel test or numerical calculation.

In the step of evaluating the equivalent cross-sectional area, the equivalent cross-sectional area may be evaluated based on a following equation.

$$Ae(x) = 4\frac{(2r\sqrt{M^2-1})^{\frac{1}{2}}}{\gamma M^2} \int_0^x \frac{\Delta p}{p}(\xi - x_0)\sqrt{x-\xi}\,d\xi$$

Where

Ae(x) denotes the equivalent cross-sectional area at a near field x point, r denotes a distance from the airframe to a near field, M denotes a cruise Mach number, γ denotes a heat capacity ratio of air, Δp/p denotes a near field pressure, and $x_0$ denotes a near field pressure starting point.

A production method of a supersonic aircraft according to an embodiment of the present invention includes: designing a supersonic aircraft by using a method of designing a shape of an airframe of a supersonic aircraft described above; and manufacturing a supersonic aircraft having an airframe shape based on a result of the designing.

A supersonic aircraft according to an embodiment of the present invention includes: an airframe including at least a part having a shape designed by setting an initial shape of the airframe and a target equivalent cross-sectional area of the airframe, estimating a near field pressure waveform for the initial shape of the airframe assuming that the supersonic aircraft flies at a cruising speed, evaluating an equivalent cross-sectional area from the estimated near field pressure waveform for the initial shape of the airframe, and setting, for the part, a Mach plane corresponding to the cruising speed, and setting a design curve on the Mach plane, the design curve corresponding to an initial curve at which the initial shape of the airframe and the Mach plane intersect so that the equivalent cross-sectional area approaches the target equivalent cross-sectional area.

Advantageous Effects of Invention

According to the present invention, in the sonic boom reduction method based on the equivalent cross-sectional area, in the process of matching the equivalent cross-sectional area of the design shape of the supersonic aircraft to the target equivalent cross-sectional area, it is possible to improve the design accuracy and it takes less time for the design.

MODE(S) FOR CARRYING OUT THE INVENTION

Hereinafter, embodiments of the present invention will be described with reference to the drawings.

Figure 1:
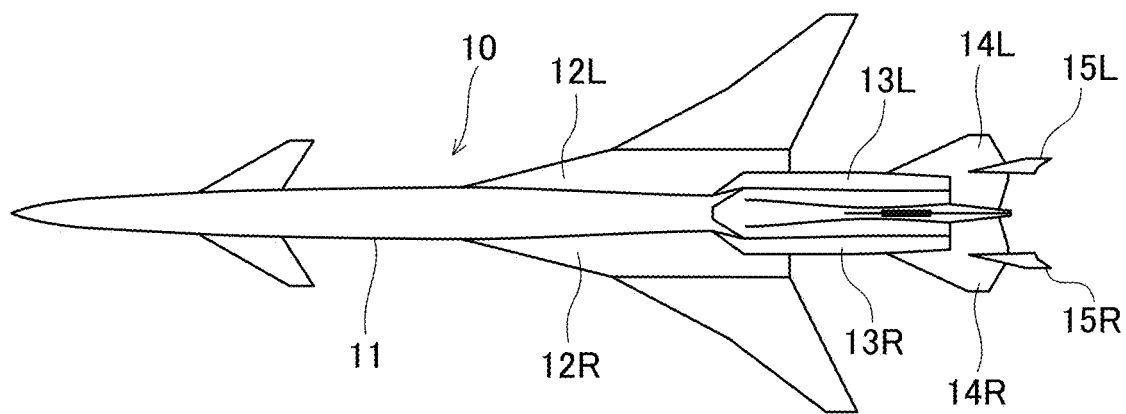
FIG. 1 A plan view showing a shape of a supersonic aircraft according to an embodiment of the present invention.
Figure 2:
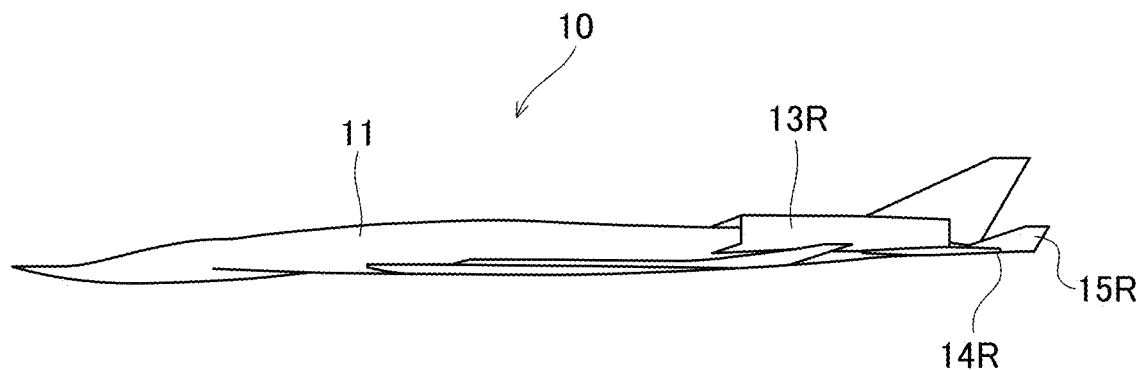
FIG. 2 A side view of the supersonic aircraft shown in FIG. 1.
Figure 3:
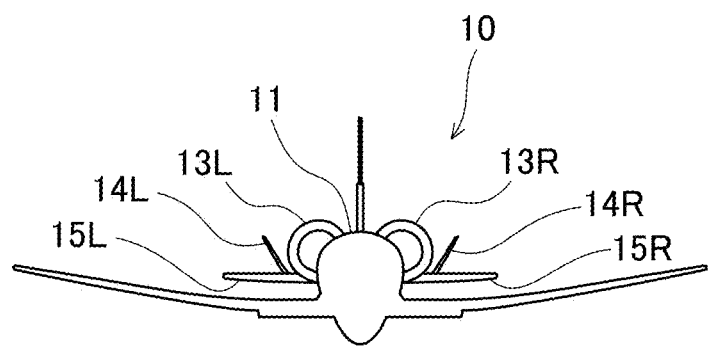
FIG. 3 A front view of the supersonic aircraft shown in FIG. 1.

FIG. 1 is a plan view showing an appearance of a supersonic aircraft according to an embodiment of the present invention, FIG. 2 is a side view thereof, and FIG. 3 is a front view thereof. In the supersonic aircraft according to this embodiment, a pair of main wings 12R and 12L, a pair of engine nacelles 13R and 13L, and a pair of horizontal tail wings 14R and 14L are provided on the fuselage 11 of the airframe 10. On the pair of horizontal tail wings 14R and 14L, fins 15R and 15L are provided respectively.

Figure 4:
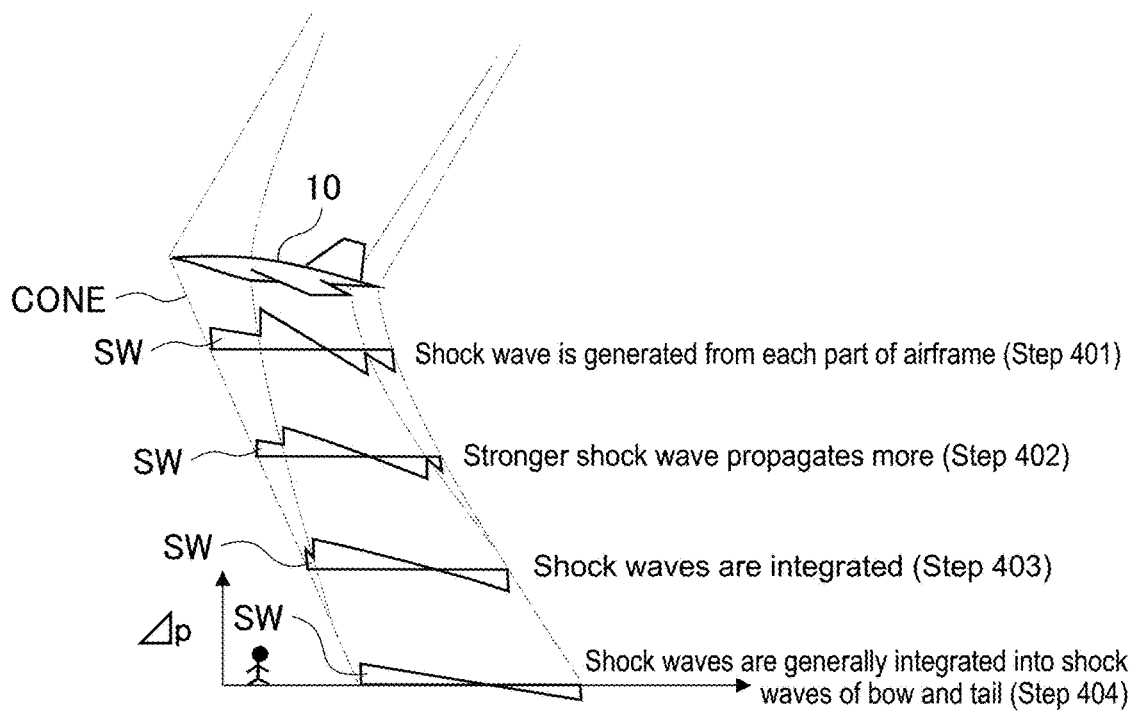
FIG. 4 A diagram for explaining a situation where the sonic boom occurs.
Figure 5:
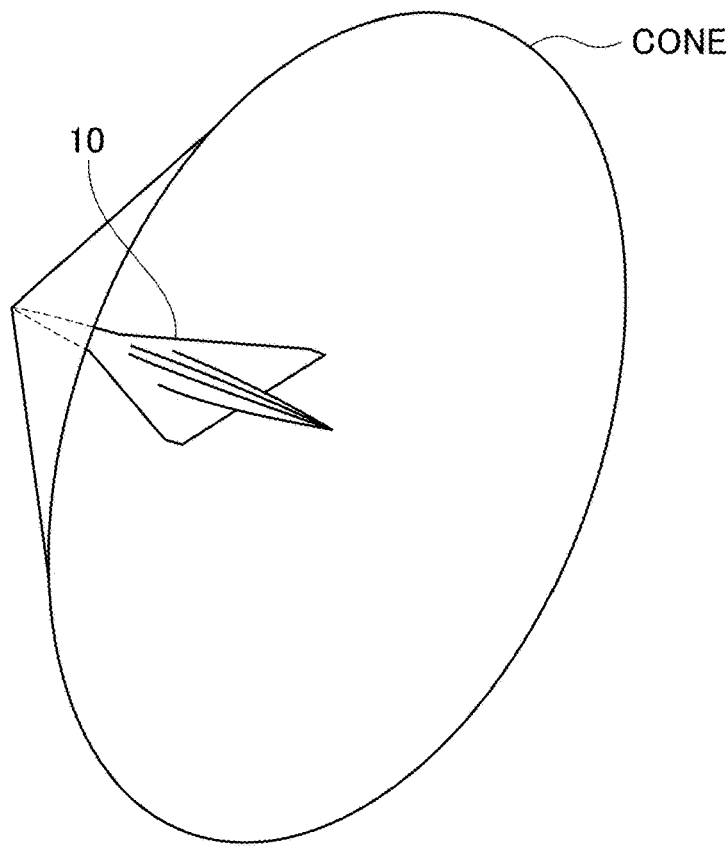
FIG. 5 A diagram showing a Mach cone.

In such a supersonic aircraft, as shown in FIG. 4, shock waves SW are generated from each part of the airframe 10 (Step 401). In the process of propagating through the atmosphere, waves with large pressure fluctuations have the phenomenon that they propagate through the atmosphere faster (Step 402), are integrated into two strong shock waves SW of the bow and tail (Step 403), and are observed as N-type pressure waves with two large pressure rises above the ground (Step 404). The shock waves SW generated by the supersonic aircraft propagate in a conical form CONE and reach the ground as shown in FIG. 5. The conical form CONE is sometimes referred to as a Mach cone. On the ground, the reached shock waves SW are observed as a sonic boom.

The present invention reduces the sonic boom by devising the shape of the airframe 10.

Figure 6:
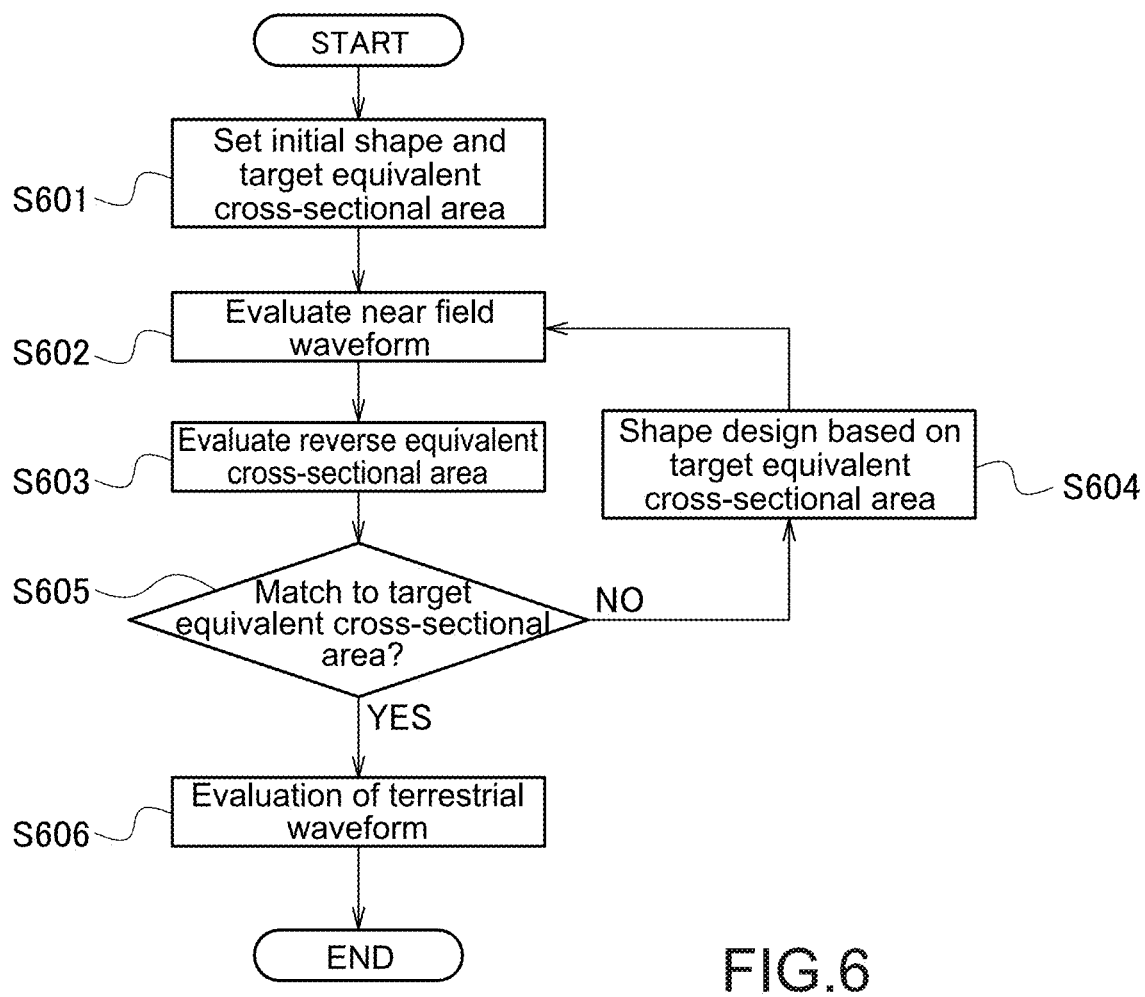
FIG. 6 A flowchart showing a method of designing an airframe shape of a supersonic aircraft according to a first embodiment of the present invention.

FIG. 6 is a flowchart illustrating a method of designing an airframe shape of a supersonic aircraft according to an embodiment of the present invention, and a first embodiment will be described with reference to the following flowchart.

Setting of Initial Shape and Target Equivalent Cross-Sectional Area (Step 601)

Figure 7:
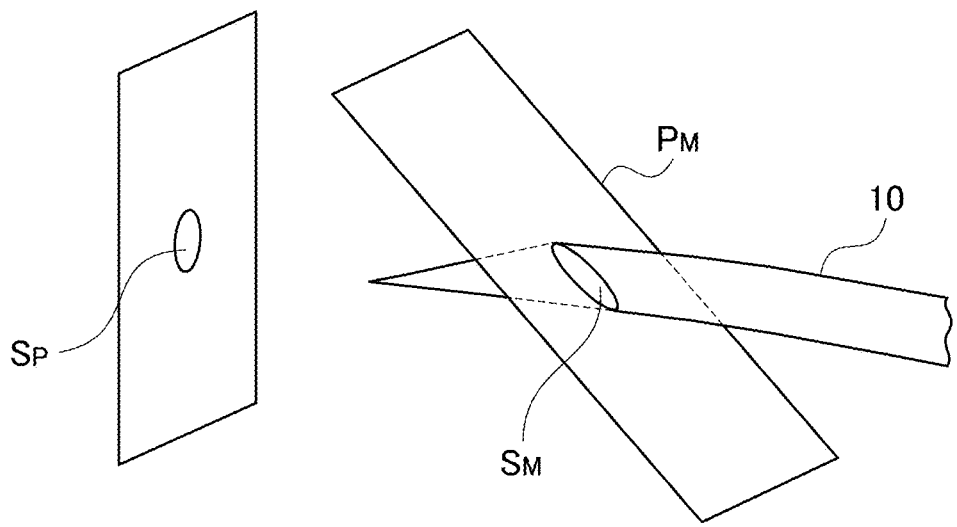
FIG. 7 A diagram for describing a definition of an equivalent cross-sectional area.

In the present embodiment, when simply referred to as "equivalent cross-sectional area", it refers to the sum of the volume equivalent cross-sectional area and the lift equivalent cross-sectional area. Here, the equivalent cross-sectional area of the supersonic aircraft is, as shown in FIG. 7, the distribution of the projected area $S_P$ of the cross-sectional area $S_M$ obtained by cutting the airframe 10 in the Mach plane $P_M$ determined by the cruise Mach number of the supersonic aircraft in the axial direction of the airframe. The Mach plane $P_M$ is a plane in which the normal vector is inclined at an angle $\mu=\sin-1(1/M)$ with respect to the airframe axis. Note that, depending on the geometric relation, the cross-sectional area $S_M$ coincides with a value obtained by multiplying the projected area $S_P$ by the cruise Mach number M.

In Step 601, the initial shape and the target equivalent cross-sectional area are set.

Figure 8:
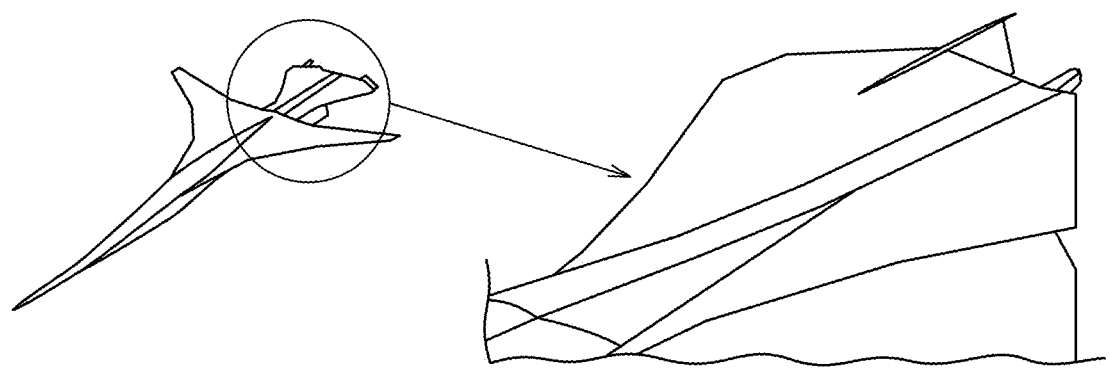
FIG. 8 A diagram showing an initial shape of a supersonic aircraft according to a first embodiment.

FIG. 8 is a diagram illustrating an initial shape of a supersonic aircraft in this embodiment. FIG. 8 is a perspective view of the airframe 10 from diagonally below. The hatched area is an area for optimizing the shape, which will be described later.

Figure 9:
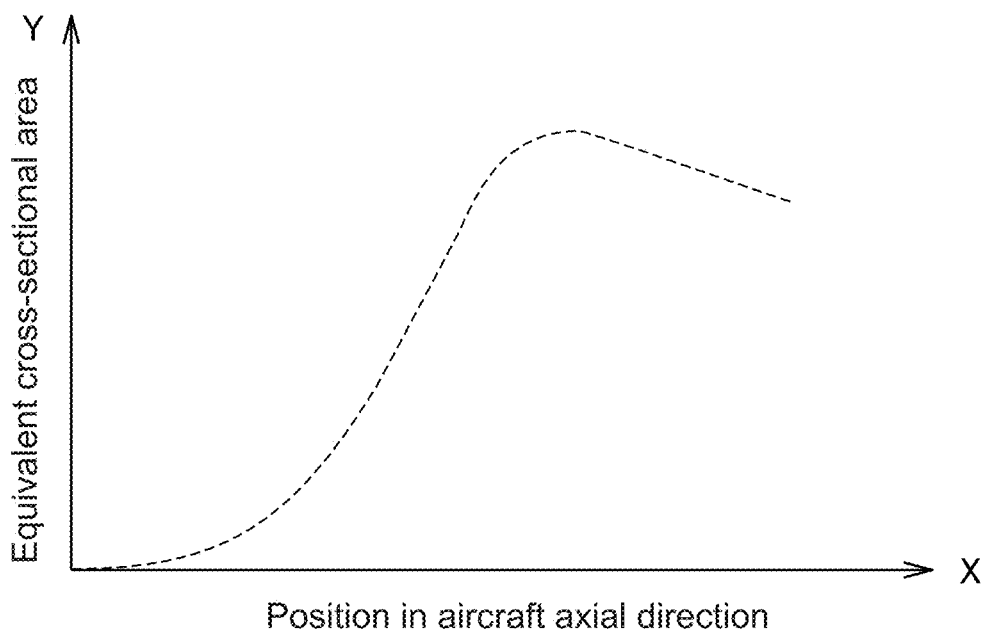
FIG. 9 A graph showing a target equivalent cross-sectional area according to the first embodiment.

FIG. 9 is a graph showing a target equivalent cross-sectional area. In this embodiment, the target equivalent cross-sectional area is empirically determined so that the sonic boom may be reduced based on the equivalent cross-sectional area of the initial shape. Representative examples of the equivalent cross-sectional area of the sonic boom reduction are exemplified in Patent Literature 1 and Non-Patent Literature 2. The descriptions of these documents are included in the disclosure herein.

Evaluation of Near Field Waveform (Step 602)

In Step 602, the near field pressure waveform is evaluated.

The near field pressure waveform for the initial shape of the airframe 10 is estimated assuming that the supersonic aircraft flies at a cruising speed.

Here, the cruising speed of the supersonic aircraft is, for example, Mach 1.6.

The near field is a position close to the airframe 10 immediately below the airframe 10 and is, for example, when the length of the airframe 10 is set to 1, a position that is 0.3 lower than the airframe 10.

The near field pressure waveform for the initial shape may typically be obtained by wind tunnel model tests and numerical calculation models.

Figure 10:
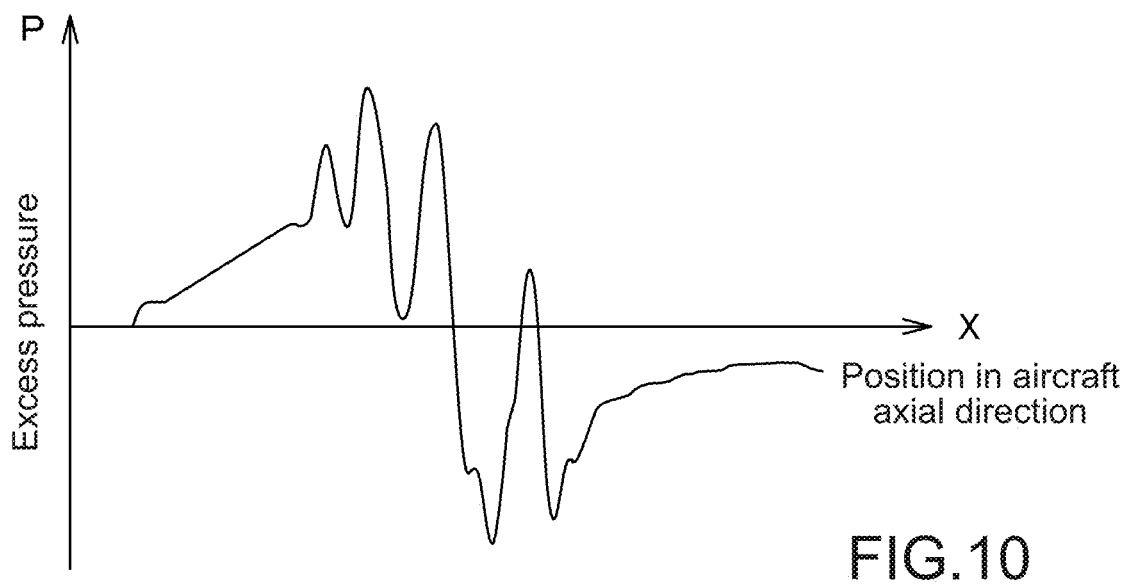
FIG. 10 A graph showing the near field waveform of the initial shape according to the first embodiment.

FIG. 10 shows the near field pressure waveform for the initial shape obtained by the numerical calculation model.

Evaluation of Reverse Equivalent Cross-Sectional Area (Step 603)

In Step 603, the equivalent cross-sectional area of the airframe 10 is evaluated from the near field pressure waveform for the initial shape shown in FIG. 10.

In the present embodiment, the equivalent cross-sectional area is evaluated using the following equation.

$$Ae(x) = 4\frac{(2r\sqrt{M^2-1})^{\frac{1}{2}}}{\gamma M^2}\int_0^x \frac{\Delta p}{p}(\xi-x_0)\sqrt{x-\xi}\,d\xi$$

Where $Ae(x)$ denotes the equivalent cross-sectional area at the near field x point, r denotes the distance from the airframe to the near field, M denotes the cruise Mach number, $\gamma$ denotes the heat capacity ratio of air, $\Delta p/p$ denotes the near field pressure, and $x_0$ denotes the near field pressure starting point.

A method of calculating an equivalent cross-sectional area from a near field waveform is described in Non-Patent Literature 3. The description of this document is included in the disclosure herein.

Figure 11:
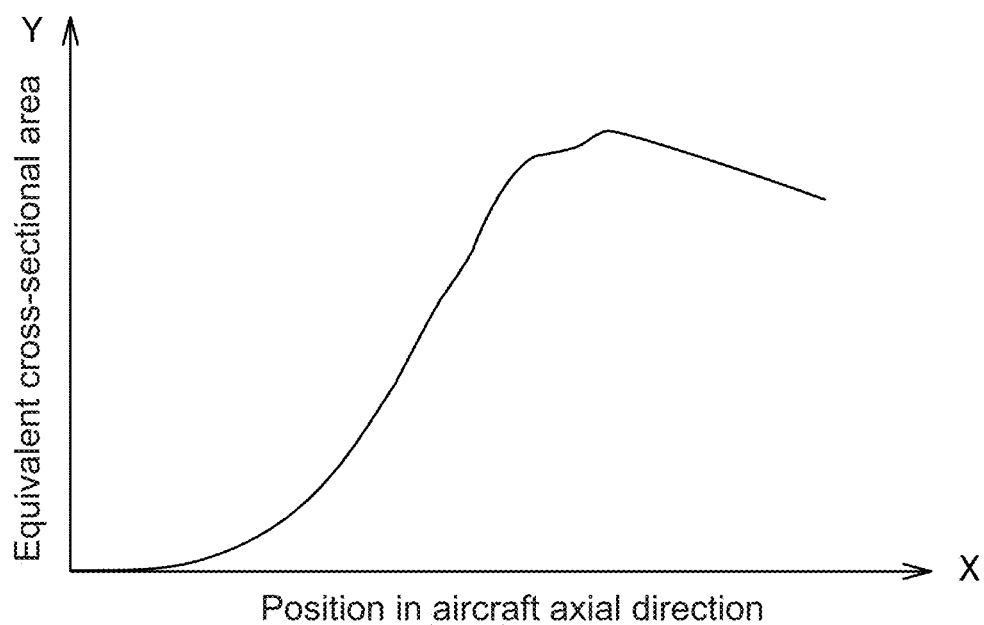
FIG. 11 A graph showing the equivalent cross-sectional area obtained from the near field waveform according to the first embodiment.

FIG. 11 shows the equivalent cross-sectional area obtained from the near field waveform for the initial shape.

Shape Design Based on the Target Equivalent Cross-Sectional Area (Steps 604, 605)

Figure 12:
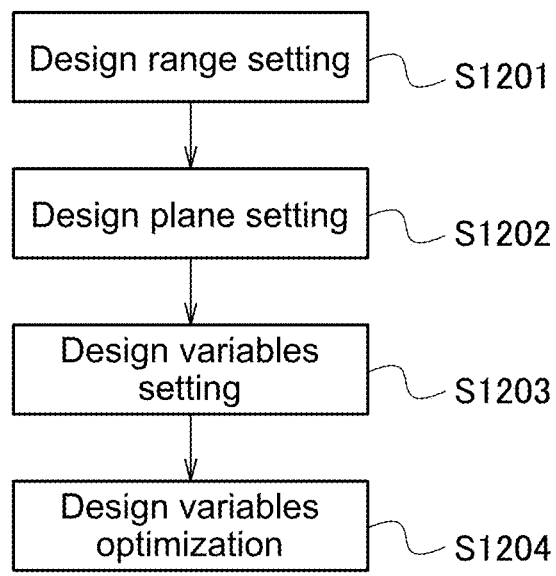
FIG. 12 A flowchart showing in detail a shape design based on a target equivalent cross-sectional area of FIG. 6.

In Step 604, a Mach plane corresponding to the cruising speed of the supersonic aircraft (Mach 1.6) is set, and the design curve corresponding to the initial curve at which the initial shape of the airframe 10 and the Mach plane intersect is set on the Mach plane, so that the equivalent cross-sectional area shown in FIG. 11 approaches the target equivalent cross-sectional area shown in FIG. 9. In this embodiment, as shown in FIG. 12, four steps are performed.

These steps will be described in order below.

Design Range Setting (Step 1201)

Figure 13:
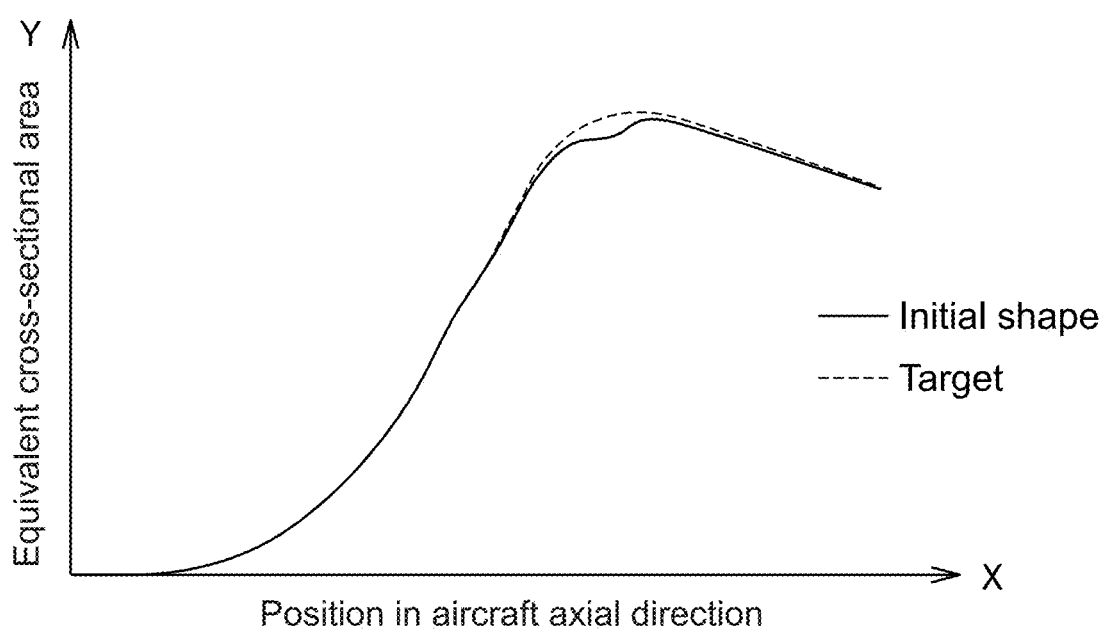
FIG. 13 A graph showing the equivalent cross-sectional area obtained from the target equivalent cross-sectional area and the near field waveform according to the first embodiment.

FIG. 13 is a graph comparing the equivalent cross-sectional area of the initial shape and the target equivalent cross-sectional area shown in FIG. 9. As shown in FIG. 13, it is understood that there is a section in which there is a large difference between the equivalent cross-sectional area and the target equivalent cross-sectional area. In this different section, to design the shape of the section so that the equivalent cross-sectional area accurately approaches the target equivalent cross-sectional area, and to perform the design by a simple process are the point of the present embodiment.

Figure 14:
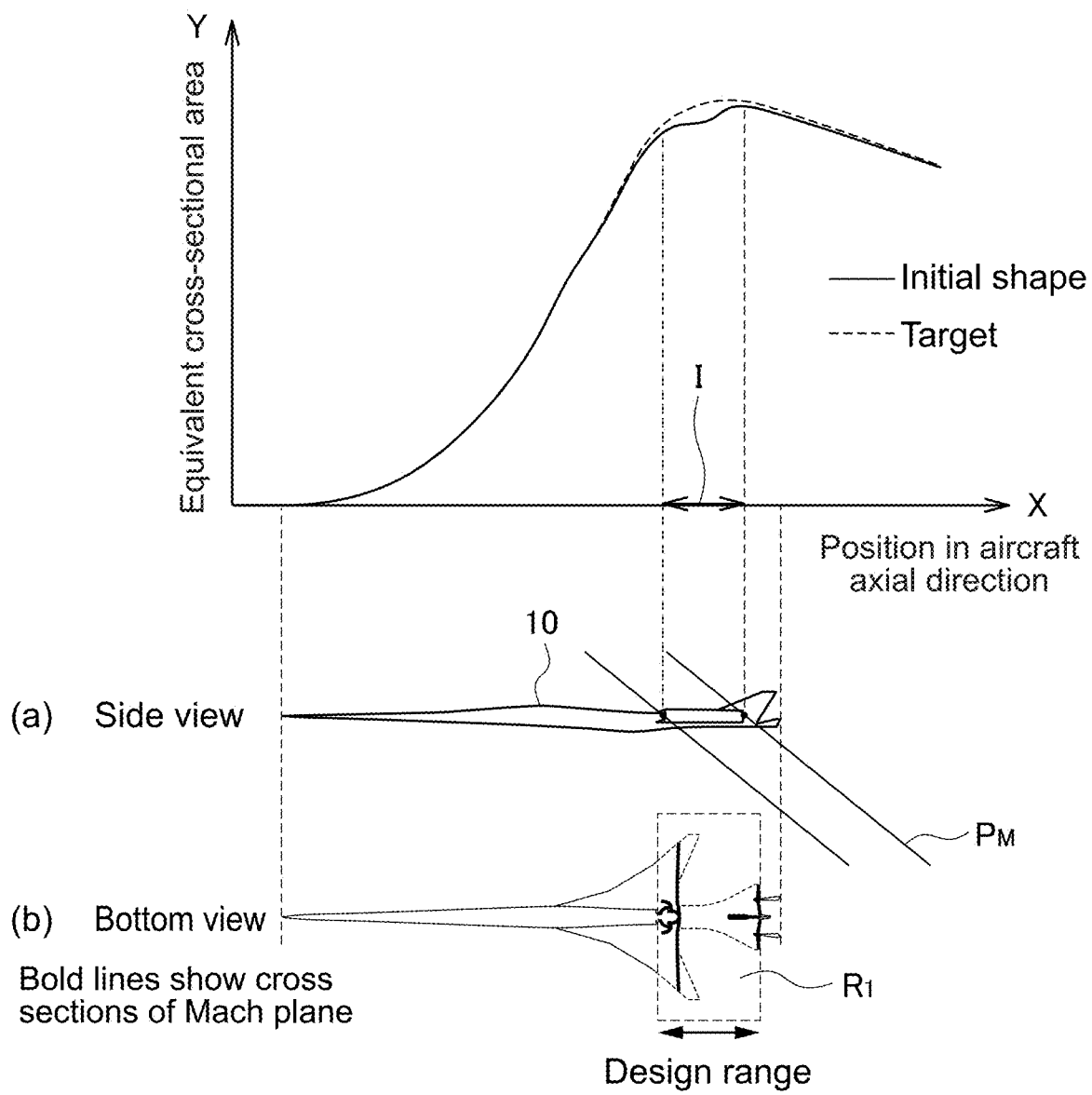
FIG. 14 An explanatory diagram of the setting of the design range according to the first embodiment.
Figure 15:
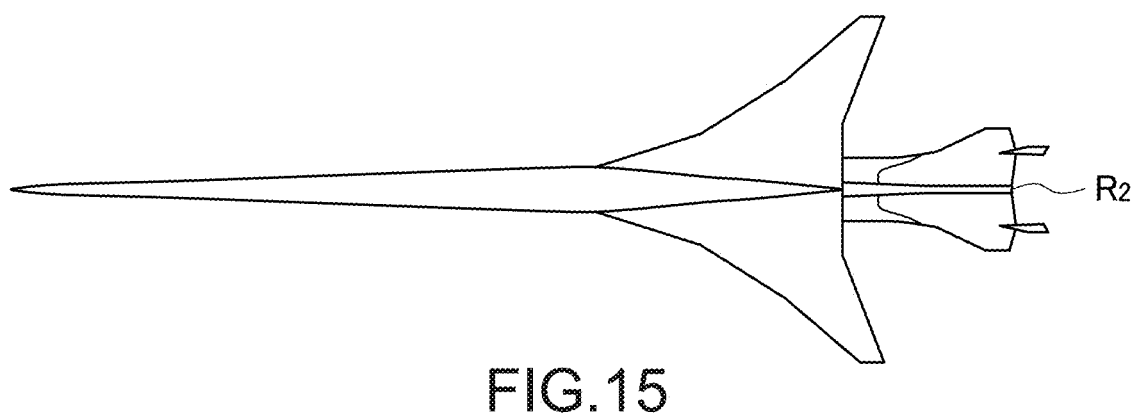
FIG. 15 An explanatory diagram of the setting of a design range according to the first embodiment (bottom view).
Figure 16:
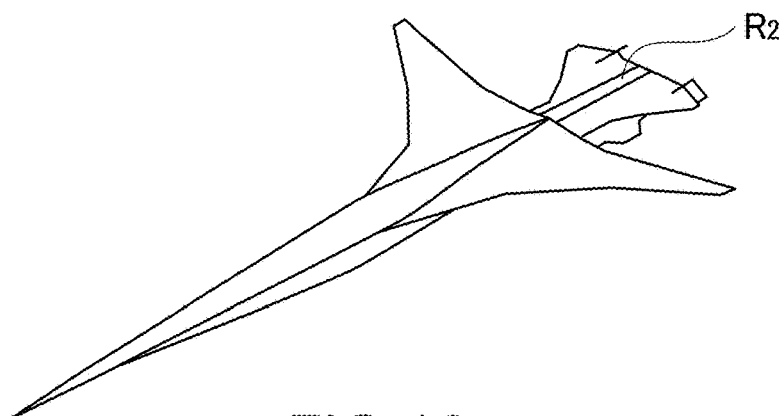
FIG. 16 An explanatory diagram of the setting of the design range according to the first embodiment (perspective view from the bottom).

First, as shown in FIG. 13, the design range is set according to the interval of the aircraft axis where the equivalent cross-sectional area and the target equivalent cross-sectional area are greatly different. Specifically, the interval I is cut by the Mach planes intersecting with the start point and the end point of the interval I of the aircraft axis respectively (FIG. 14(a)), and the region sandwiched by the lines on which the Mach planes cross the bottom surface of the airframe 10 is set as the design region $R_1$ (FIG. 14(b)). The design region $R_1$ shown in FIG. 14 includes the airframe, the main wings, the nacelles, the tail, and the like, but as a typical example, as shown in FIGS. 15 and 16, the design region is narrowed to the rear lower surface of the airframe ($R_2$).

Design Plane Setting (Step 1202)

Figure 17:
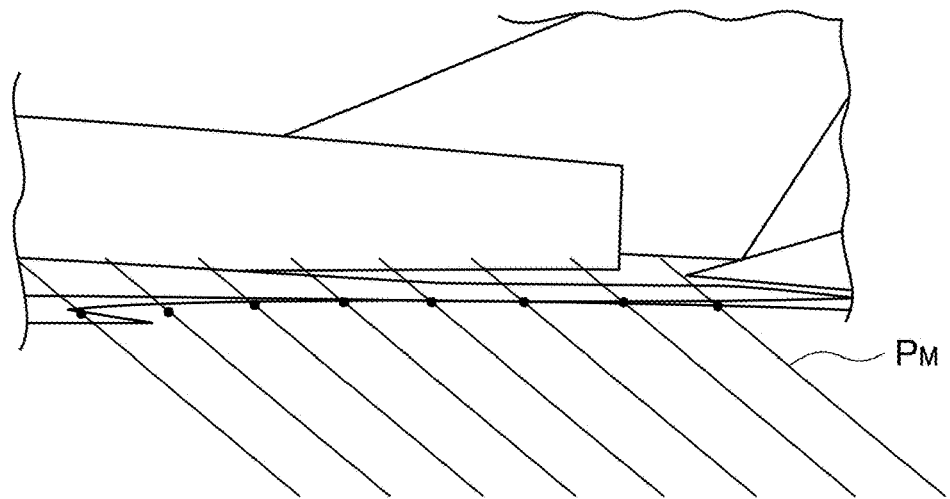
FIG. 17 An explanatory diagram of the setting of the design plane according to the first embodiment (side view).
Figure 18:
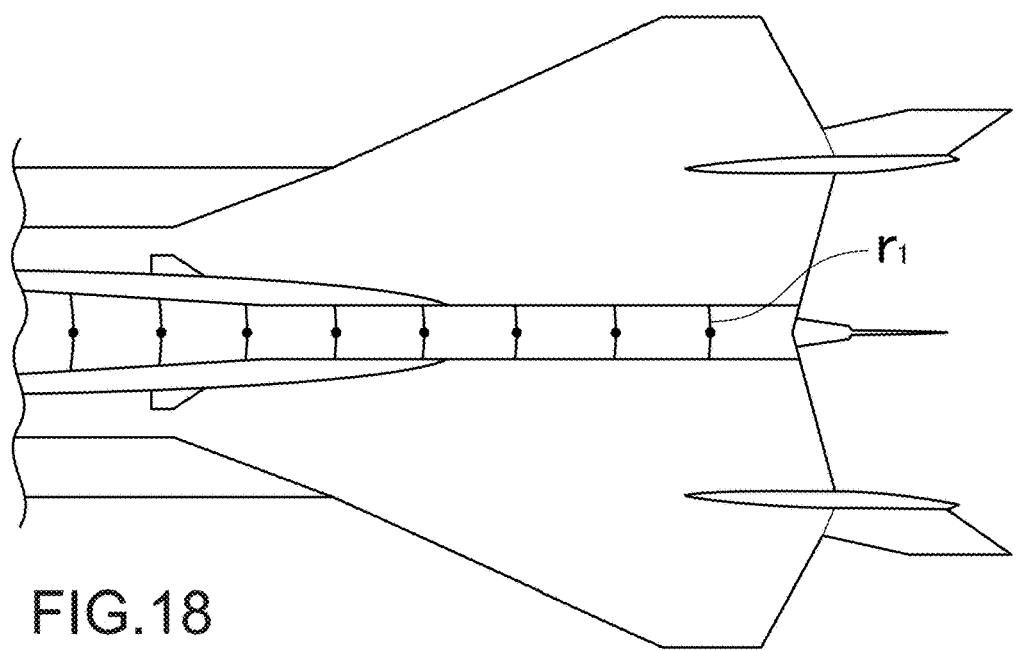
FIG. 18 An explanatory diagram of the setting of the design plane according to the first embodiment (bottom view).

As shown in FIGS. 17 and 18, a plurality of Mach planes, for example, eight Mach planes $P_M$, intersecting with the lower surface of the rear portion of the fuselage of the initial shape are set, and curves are designed on these Mach planes $P_M$. $r_1$ shown in FIG. 18 shows a curve in which the Mach plane $P_M$ intersects with the lower surface of the rear portion of the fuselage of the initial shape.

That is, a plane that is not parallel to the Mach plane is conventionally used as the design plane (Non-Patent Literatures 5 and 6), but the present embodiment differs in that the Mach plane is used as the design plane.

Design Variables Setting (Step 1203)

Figure 19:
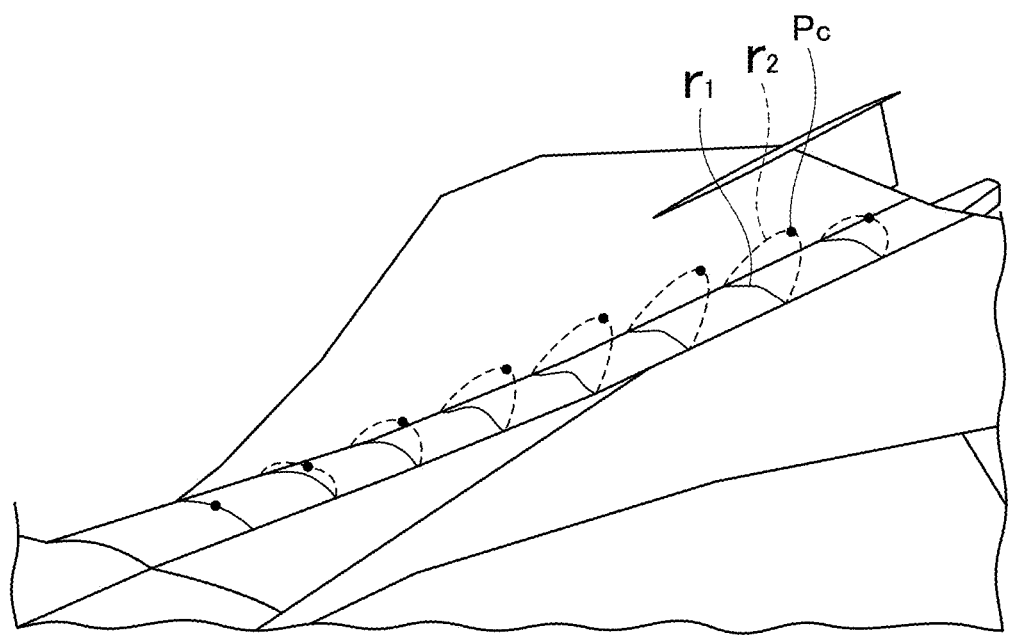
FIG. 19 An explanatory diagram of the setting of the design variable according to the first embodiment.

As shown in FIG. 19, the midpoint of the design curve $r_2$ on each of the eight Mach planes $P_M$ is set as the control point $P_c$, and the position of each control point $P_c$ is set as the design variable.

Design Variables Optimization (Step 1204)

Figure 20:
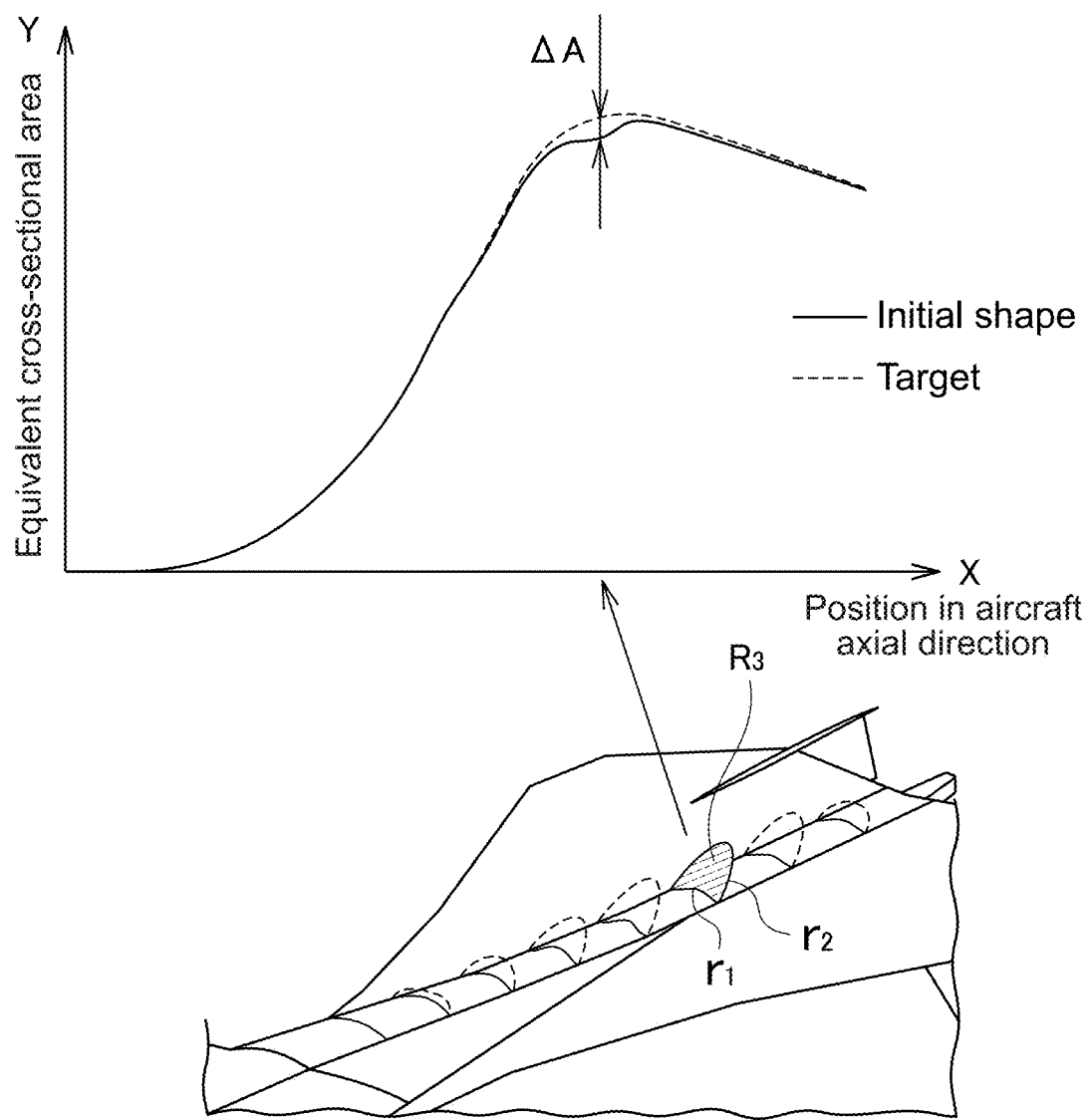
FIG. 20 An explanatory diagram of optimization of the design variable according to the first embodiment.

As shown in FIG. 20, the area (hatched lines in FIG. 20) of the region $R_3$ surrounded by the curve $r_1$ of the initial shape and the curve $r_2$ of the design shape is optimized. That is, the area of the region $R_3$ is matched to the value obtained by multiplying the difference from the equivalent cross-sectional area at the position corresponding to the design plane by the cruise Mach number. This is expressed by the following equation.

$$R_3 = \Delta A \times \text{Mach}$$

Where $\Delta A$ denotes the difference between the target equivalent cross-sectional area and the equivalent cross-sectional area of the initial shape, and Mach denotes the cruise Mach number.

Figure 21:
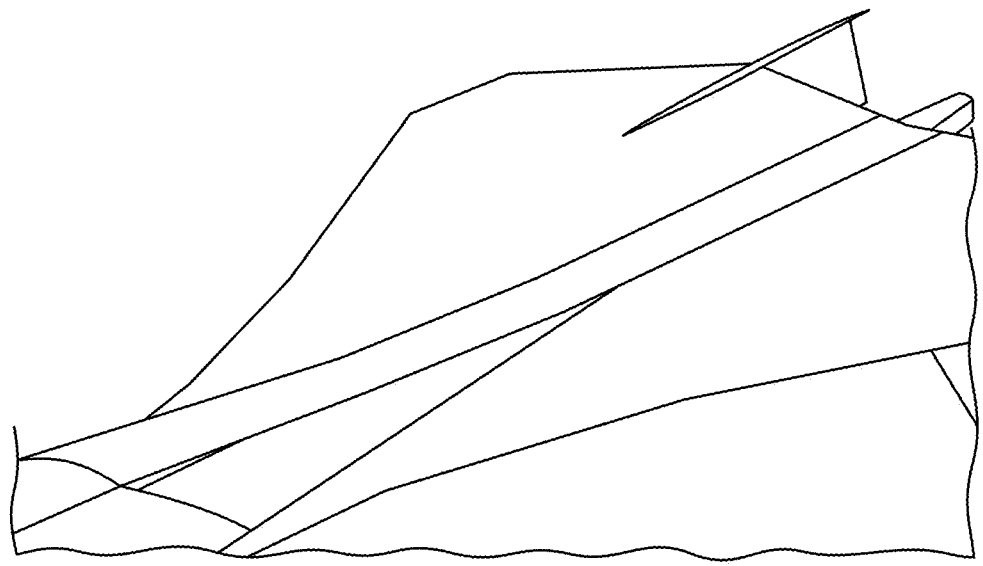
FIG. 21 A perspective view of an initial shape according to a first embodiment as viewed diagonally from below.
Figure 22:
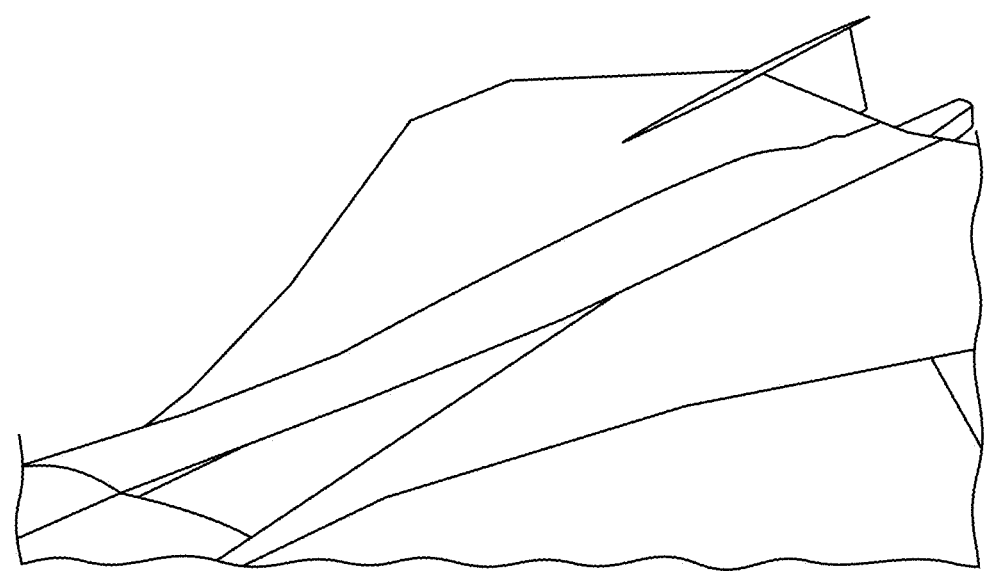
FIG. 22 A perspective view of the design shape according to the first embodiment as viewed diagonally from below.

FIG. 21 shows the initial shape of the lower surface of the rear portion of the fuselage, and FIG. 22 shows the design shape therefor.

Evaluation of the Terrestrial Waveform (Step 606)

In Step 606, the terrestrial waveform is evaluated.

Figure 23:
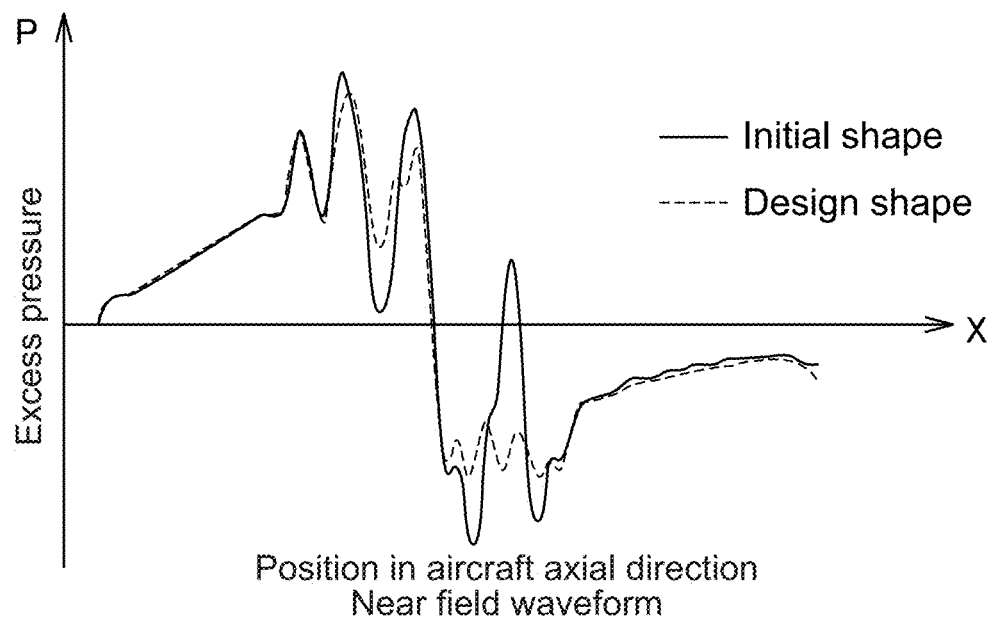
FIG. 23 A graph showing a near field waveform of the initial shape and the design shape according to the first embodiment.

FIG. 23 shows a near field waveform of the initial shape and the design shape in this embodiment. Further, FIG. 24 is a graph showing the ground waveform of the initial shape and the design shape.

Figure 24:
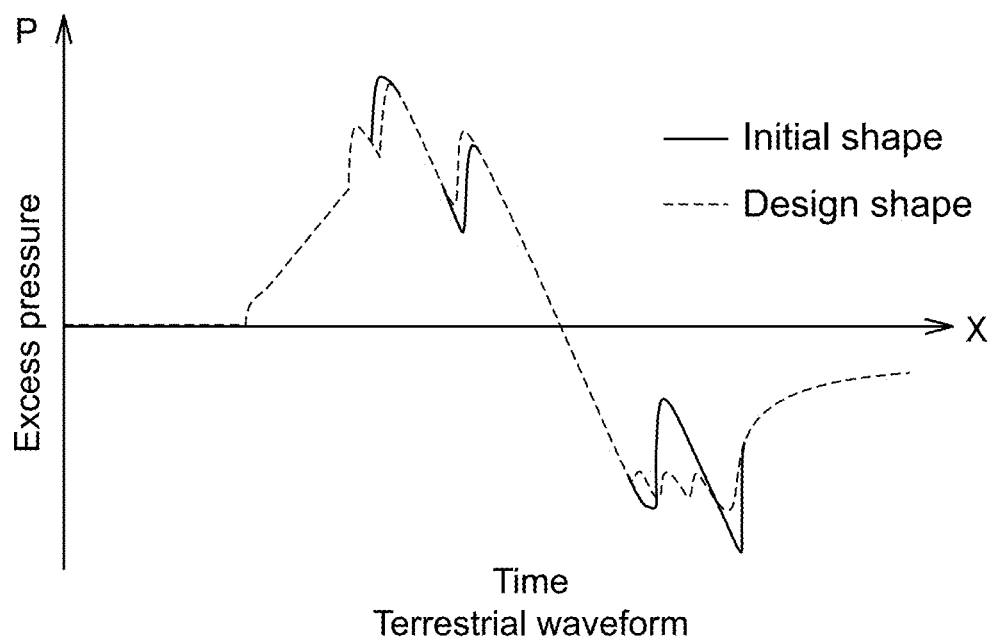
FIG. 24 A graph showing the ground waveform of the initial shape and the design shape according to the first embodiment.

In this embodiment, it is understood that, as shown in FIG. 24, the waveform portion corresponding to the rear end boom of the terrestrial waveform is optimized and the sonic boom noise level is improved. Further, in this example, because the change of lift equivalent cross-sectional area is negligible, the region may be designed without repetition (single design). In the case of a region where the change of lift equivalent cross-sectional area may not be ignored, Step 604 may be repeated until a precise result is obtained.

Operation and Effect of Present Invention

Figure 25:
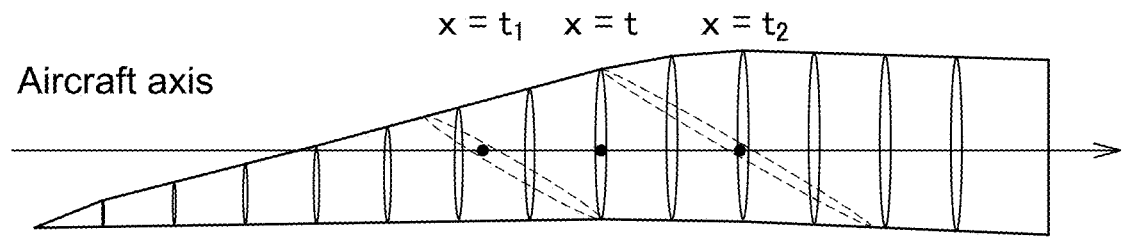
FIG. 25 A diagram showing the relationship between the two-dimensional cross-sectional area and the volume equivalent cross-sectional area on a plane perpendicular to the aircraft axis.

In an embodiment of a prior art, as shown in FIG. 25, when changing the cross-sectional area of the two-dimensional cross-sectional area defined on a plane perpendicular to the aircraft axis, the volume equivalent cross-sectional area changes in the section $t1<x<t2$. In other words, when the change in the two-dimensional cross section is considered as "input" and the change in the volume equivalent cross-sectional area is considered as "output", it is a complicated system in which the relationship between input and output is not one-to-one.

In the present embodiment, when changing the cross-sectional area of the two-dimensional cross-sectional area defined on the Mach plane, the volume equivalent cross-sectional area changes only at the same position $x=t$. In other words, the input-output relationship is a simple one-to-one system. For the one-to-one correspondence, the more precise design considering up to the first-order derivative is possible, and the design accuracy is improved. Since it is a simple system, the number of repetitions of the process to match the equivalent cross-sectional area of the design shape to the target equivalent cross-sectional area is reduced, and it takes less time for the design. In particular, the equivalent cross-sectional area may be matched to the target equivalent cross-sectional area without repetition of the process when the change of lift equivalent cross-sectional area is negligible.

That is, in the present embodiment, the Mach plane is the design plane, and the change in the volume equivalent cross-sectional area with respect to the change in the two-dimensional cross-sectional area is a simple one-to-one system. So, as compared with the prior art, more precise design is possible, and the design is completed in a shorter period.

Second Embodiment

Figure 26:
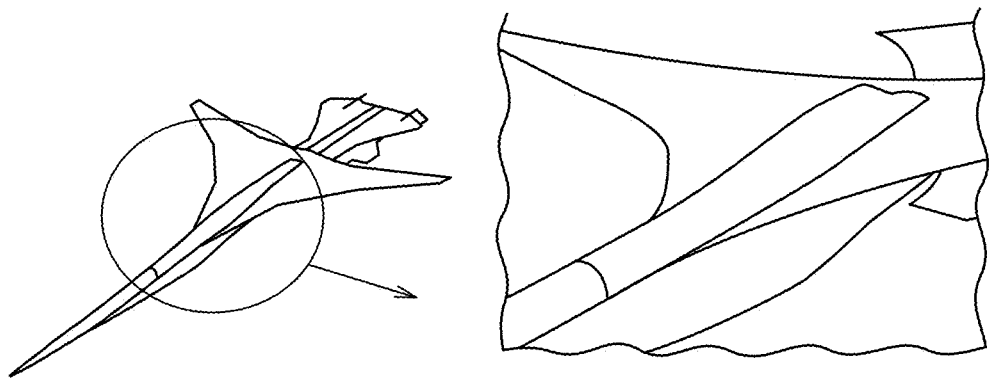
FIG. 26 A perspective view as viewed from diagonally below the initial shape according to the second embodiment.
Figure 27:
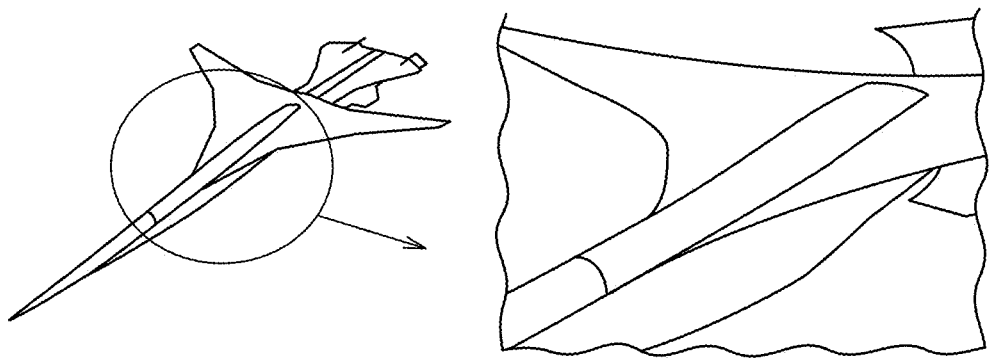
FIG. 27 A perspective view as viewed from diagonally below the design shape according to the second embodiment.

FIG. 26 is a perspective view of the airframe of the initial shape according to the second embodiment as viewed diagonally from below. FIG. 27 is a perspective view of the airframe with its design shape viewed diagonally from below.

Figure 28:
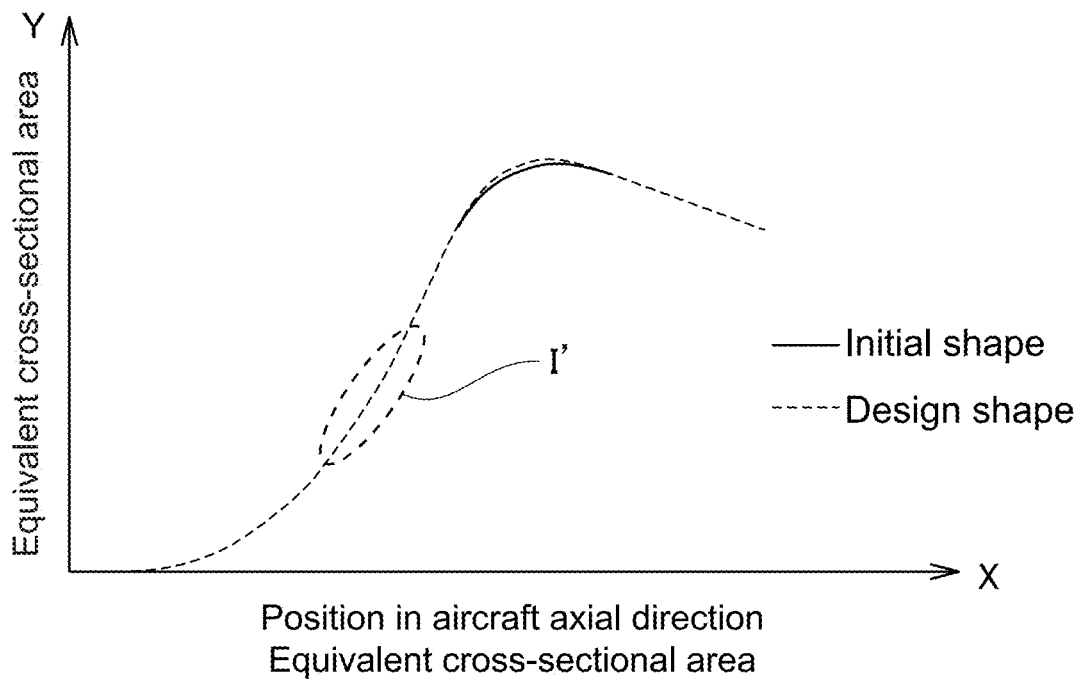
FIG. 28 A graph showing the equivalent cross-sectional area obtained from the target equivalent cross-sectional area and the near field waveform according to the second embodiment.

In this embodiment, the design shape is obtained by the design method according to the flowchart of FIG. 6 for the local section I' of the middle lower surface of the airframe 10 as shown in FIG. 28.

Figure 29:
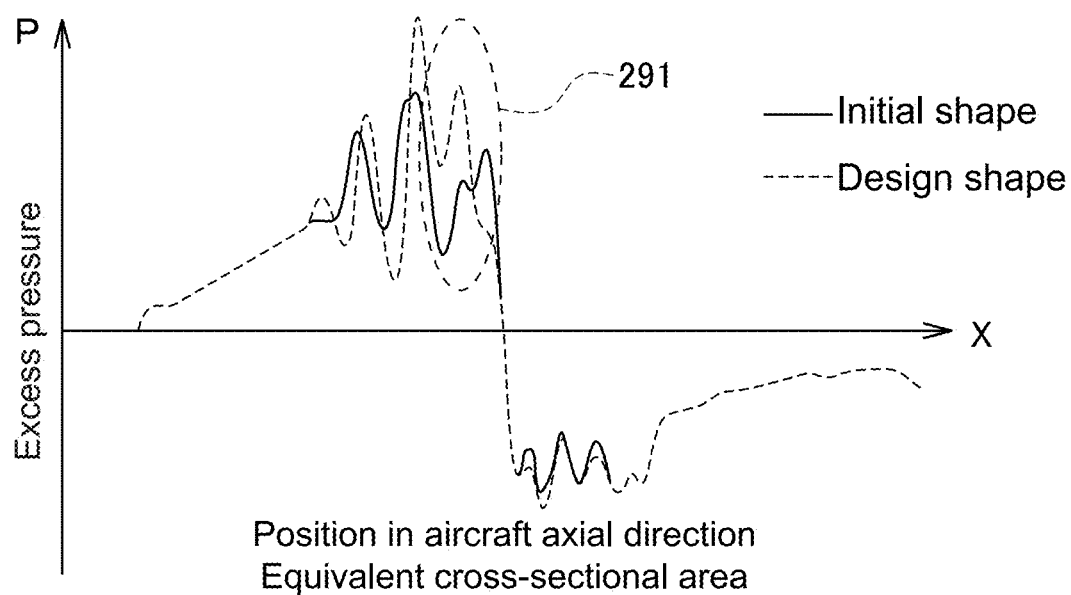
FIG. 29 A graph showing a near field waveform of the initial shape and the design shape according to the second embodiment.
Figure 30:
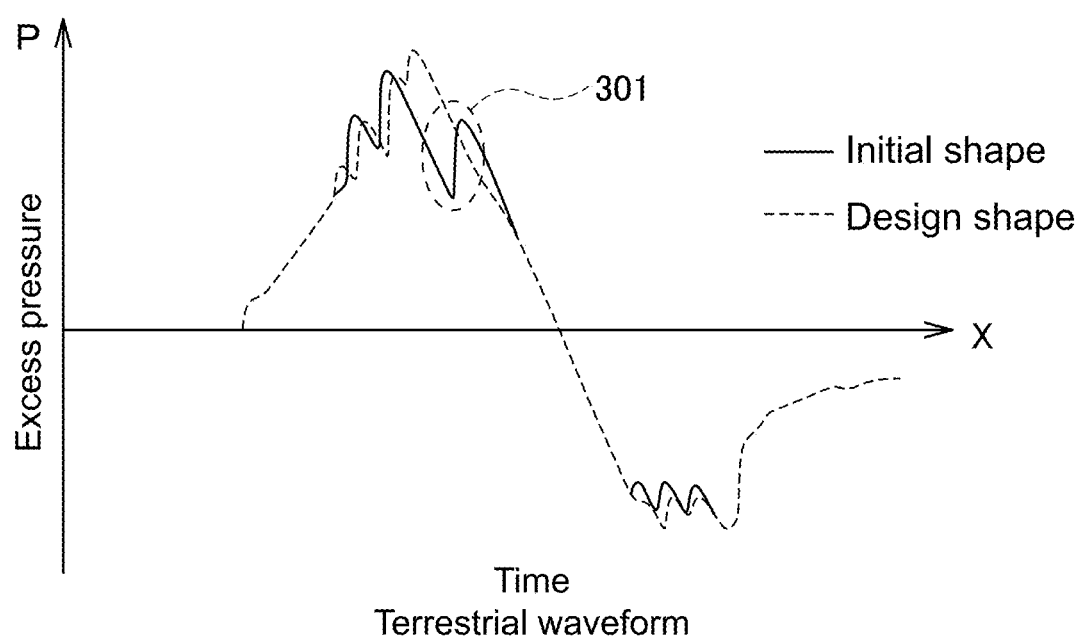
FIG. 30 A graph showing the ground waveform of the initial shape and the design shape according to the second embodiment.

In this embodiment, as shown in FIGS. 29 and 30, there is no local pressure increase near the near field waveform intermediate 291 and the ground waveform intermediate 301, and the sonic boom noise level is improved. Then, a precise design requiring control up to the first-order derivative of the equivalent cross-sectional area is obtained.

Other Examples

The present invention is not limited to the embodiments described above, and may be implemented by various modifications and applications within the scope of the technical idea. The scope of implementation also belongs to the technical scope of the present invention.

For example, in the embodiment described above, the design shape according to the present invention is obtained for a part of the fuselage, but the present invention is not limited to this, and may be applied to the entire fuselage, or to any part of the airframe, such as only the main wing or the fuselage and the main wing.

In addition, the shape of the airframe of the supersonic aircraft based on the design method of the present invention has a remarkable effect of reducing the sonic boom, which is different from the conventional shape in that respect and may be distinguished. That is, an airframe includes at least a part having a shape designed by setting an initial shape of the airframe and a target equivalent cross-sectional area of the airframe, estimating a near field pressure waveform for the initial shape of the airframe assuming that the supersonic aircraft flies at a cruising speed, evaluating an equivalent cross-sectional area from the estimated near field pressure waveform for the initial shape of the airframe, and setting, for the part, a Mach plane corresponding to the cruising speed, and setting a design curve on the Mach plane, the design curve corresponding to an initial curve at which the initial shape of the airframe and the Mach plane intersect so that the equivalent cross-sectional area approaches the target equivalent cross-sectional area. The shape of the airframe is a novel shape that is not conventional, a shape may be obtained by a simple design process, and a sonic boom reduction may be achieved.

REFERENCE SIGNS LIST

10: airframe
$P_M$: Mach plane
$P_c$: control point
$S_M$: cross-sectional area
$r_2$: design curve

The invention claimed is:

1. A method of designing a shape of an airframe of a supersonic aircraft, comprising:
   setting an initial shape of the airframe and a target equivalent cross-sectional area of the airframe;
   estimating a near field pressure waveform for the initial shape of the airframe assuming that the supersonic aircraft flies at a cruising speed;
   evaluating an equivalent cross-sectional area from the estimated near field pressure waveform for the initial shape of the airframe; and
   setting a Mach plane corresponding to the cruising speed, and setting a design curve on the Mach plane, the design curve corresponding to an initial curve at which the initial shape of the airframe and the Mach plane intersect so that the equivalent cross-sectional area approaches the target equivalent cross-sectional area,
   wherein, in the step of setting the design curve on the Mach plane, the area of a region surrounded by the initial curve and the design curve on the Mach plane is matched to a value obtained by multiplying a difference between the target equivalent cross-sectional area and the equivalent cross-sectional area at a position corresponding to the region by a cruise Mach number corresponding to the cruising speed to thereby set the design curve on the Mach plane.

2. The method of designing a shape of an airframe of a supersonic aircraft according to claim 1, wherein
   in the step of setting the design curve on the Mach plane, a midpoint of the design curve of the Mach plane is set as as-a control point, a position of the control point is set as a design variable, and the control point is optimized such that the area is matched to the value obtained by multiplying the difference between the target equivalent cross-sectional area and the equivalent cross-sectional area at the position corresponding to the region by the cruise Mach number corresponding to the cruising speed.

3. The method of designing a shape of an airframe of a supersonic aircraft according to claim 1, wherein
   in the step of setting the initial shape of the airframe and the target equivalent cross-sectional area of the airframe, the target equivalent cross-sectional area is set based on the equivalent cross-sectional area of the initial shape.

4. The method of designing a shape of an airframe of a supersonic aircraft according to claim 1, further comprising:
   after the step of setting the design curve on the Mach plane,
   estimating a near field pressure waveform for a shape corresponding to the design curve of the airframe assuming that the supersonic aircraft flies at a cruising speed;
   evaluating an equivalent cross-sectional area from the estimated near field pressure waveform for the shape corresponding to the design curve of the airframe; and
   setting a Mach plane corresponding to the cruising speed, and resetting a design curve on the Mach plane, the design curve corresponding to a curve at which the shape corresponding to the design curve of the airframe and the Mach plane intersect so that the equivalent cross-sectional area approaches the target equivalent cross-sectional area.

5. The method of designing a shape of an airframe of a supersonic aircraft according to claim 1, wherein
   in the step of estimating the near field pressure waveform, the near field pressure waveform is estimated by wind tunnel test or numerical calculation.

6. The method of designing a shape of an airframe of a supersonic aircraft according to claim 1, wherein
   in the step of evaluating the equivalent cross-sectional area, the equivalent cross-sectional area is evaluated based on a following equation:

$$Ae(x) = 4 \frac{\left(2r\sqrt{M^2-1}\right)^{\frac{1}{2}}}{\gamma M^2} \int_0^x \frac{\Delta p}{p} (\xi - x_0) \sqrt{x - \xi} \, d\xi$$

where
Ae(x) denotes the equivalent cross-sectional area at a near field x point,
r denotes a distance from the airframe to a near field,
M denotes a cruise Mach number,
γ denotes a heat capacity ratio of air,
Δp/p denotes a near field pressure, and
$x_0$ denotes a near field pressure starting point.

7. A production method of a supersonic aircraft, comprising:
   designing a supersonic aircraft by using a method of designing a shape of an airframe of a supersonic aircraft including
   setting an initial shape of the airframe and a target equivalent cross-sectional area of the airframe,
   estimating a near field pressure waveform for the initial shape of the airframe assuming that the supersonic aircraft flies at a cruising speed, evaluating an equivalent cross-sectional area from the estimated near field pressure waveform for the initial shape of the airframe, and setting a Mach plane corresponding to the cruising speed, and setting a design curve on the Mach plane, the design curve corresponding to an initial curve at which the initial shape of the airframe and the Mach plane intersect so that the equivalent cross-sectional area approaches the target equivalent cross-sectional area; and manufacturing a supersonic aircraft having an airframe shape based on a result of the designing, wherein, in the step of setting the design curve on the Mach plane, the area of a region surrounded by the initial curve and the design curve on the Mach plane is matched to a value obtained by multiplying a difference between the target equivalent cross-sectional area and the equivalent cross-sectional area at a position corresponding to the region by a cruise Mach number corresponding to the cruising speed to thereby set the design curve on the Mach plane.

8. A supersonic aircraft, comprising:

an airframe including at least a part having a shape designed by setting an initial shape of the airframe and a target equivalent cross-sectional area of the airframe, estimating a near field pressure waveform for the initial shape of the airframe assuming that the supersonic aircraft flies at a cruising speed, evaluating an equivalent cross-sectional area from the estimated near field pressure waveform for the initial shape of the airframe, and setting, for the part, a Mach plane corresponding to the cruising speed, and setting a design curve on the Mach plane, the design curve corresponding to an initial curve at which the initial shape of the airframe and the Mach plane intersect so that the equivalent cross-sectional area approaches the target equivalent cross-sectional area, wherein, in the step of setting the design curve on the Mach plane, the area of a region surrounded by the initial curve and the design curve on the Mach plane is matched to a value obtained by multiplying a difference between the target equivalent cross-sectional area and the equivalent cross-sectional area at aposition corresponding to the region by a cruise Mach number corresponding to the cruising speed to thereby set the design curve on the Mach plane.

9. The method of designing a shape of an airframe of a supersonic aircraft according to claim 1, wherein the method of designing a shape of an airframe of a supersonic aircraft is a method of designing a shape of a fuselage of the airframe.

* * * * *